3,015,644
STABILIZING POLYPROPYLENE WITH ORGANIC-TIN-MERCAPTO COMPOUNDS

William E. Leistner and Olga H. Knoepke, Brooklyn, and Arthur C. Hecker, Richmond Hill, N.Y., assignors to Argus Chemical Corporation, a corporation of New York
No Drawing. Filed Jan. 31, 1958, Ser. No. 712,306
6 Claims. (Cl. 260—45.75)

This invention relates to polyolefin plastics containing an admixed mercapto tin compound as a viscosity preserver.

This application is a continuation-in-part of application Serial No. 696,572, filed by us on November 14, 1957, for Polyethylene Composition.

In polyethylene and polypropylene plastics, for example, the "melt index" is an important feature. This index relates to the viscosity. More specifically, it is the rate of extrusion (grams in 10 minutes) at 190° C. through an orifice of diameter 0.0825 inch under a force of 2160 g. acting on a piston 0.376 inch in diameter of face that applies the pressure to the polyolefin plastic, all as described in A.S.T.M. Specification D1238–52T.

For a standard commercial specimen of polyethylene, the melt index was found to be 0.68. When this specimen was maintained at 130° C. for four hours before being tested as above, the melt index increased approximately 5%. When maintained for eight hours at 130° C. and then tested, the melt index increased by 112%. For the same specimen of polyethylene into which a representative one of our viscosity preserving agents had been mixed in the proportion of 0.5% of the weight of the polyethylene, the melt index was 0.71. The increase in the index on heating was so slight as to be either within the experimental error or without significance, up to a total time of heating of 48 hours at 130° C. When the time of heating was extended, there was still no objectionable increase in the rate of extrusion and, at 120 hours' heating, the rate of extrusion actually had begun to fall slightly.

It is considered, therefore, that our viscosity preserving agent introduces some slow secondary change, such as molecular complexing, so as to offset approximately any decrease in viscosity that would otherwise be expected in the polyethylene plastic maintained at the elevated temperature. Polyethylene antioxidants, suggested or used by others, do not exhibit this effect.

Polypropylene without our viscosity preserver melts to a free flowing liquid when exposed to a temperature of about 200° C. for a comparatively short time. With our preserver admixed, the polypropylene remains plastic.

Furthermore, our additive decreases greatly the development of brittleness of both polyethylene and polypropylene on exposure to light.

Our invention comprises polyolefin plastics including, as admixed viscosity preserver, a mercapto tin compound, more particularly, an alkyl, cycloalkyl, or aryl tin mercaptide of the formula $$R_xSn(SR')_{4-x}$$

in which R is a $C_1$–$C_{18}$ monovalent hydrocarbon radical and SR' is the radical of a mercaptan HSR'. In any case, the tin atom is linked directly to the sulfur of the mercapto group or groups and $x$ is an integer within the range 1–3.

Examples of R are $C_1$–$C_{18}$ alkyl, $C_3$ and higher cycloalkyl, and $C_6$–$C_{10}$ aryl groups, such as butyl, hexyl, dodecyl, cyclopentane, cyclohexane, hexahydrotoluene, phenyl, naphthyl, and benzyl radicals.

The R' in SR' represents a simple hydrocarbon radical and may, therefore, be any one of the groups represented by R. But the hydrocarbon radical R' may also contain substituting groups such as unesterified or esterified hydroxy (OH), carboxy (COOH), carboxy ester (COOR''), and carboxy amide (CONR'''$_2$) groups, R'' being a $C_1$–$C_{12}$ alkyl and R''' either hydrogen, a $C_1$–$C_{12}$ monovalent hydrocarbon radical, or both. Also SR' may represent the radical of xanthate (thionocarbonic acid ester).

Examples of unsubstituted mercaptans that provide suitable SR' groups are butyl, hexyl, octyl, dodecyl, octadecyl, phenyl, naphthyl and benzyl mercaptan.

Examples of substituted mercaptans are mercaptoethanol, thioglycerine, mercaptoethanol laurate (an esterified hydroxy), dimercaptoethanol adipate, dimercaptoethanol phthalate, thioglycolic acid, mercaptosuccinic acid, octyl thioglycolate, ethylene glycol dithioglycolate, dibutyl mercaptosuccinate, diamylamide or morpholinamide of thioglycolic acid, dibutylamide of gamma-thiobutyric acid, and isopropyl or octyl xanthate.

Particularly suitable alkyl radicals in the mercapto compounds of the kind described are the $C_4$–$C_{13}$ alkyls. Such radicals make preservers whose odor is so slight as to be unobjectionable and which are substantially non-volatile, at temperatures of use of the polyethylene plastics and compatible with polyethylene, that is, non-separating therefrom at all temperatures of use.

The tin mercapto compounds which we use are prepared by conventional technique and methods. Thus alkylstannonic acids of the type formula

the dialkyl tin oxides $R_2SnO$, or trialkyl tin hydroxides $R_3SnOH$ are mixed with the stoichiometric proportion of a mercaptan R'SH. The R and R' groups in the materials selected are those which are to appear as R and R', respectively, in the finished tin mercapto compound of the formula first given above. Water formed in the reaction is removed in any conventional manner, as by being distilled azeotropically from the reaction mixture by means of an admixed chemically inert azeotroping liquid such as benzene, toluene, or xylene.

Alternatively, the tin mercapto compounds are prepared from an organo tin chloride such as $R_2SnCl_2$ and the mercaptan R'·SH in proportion to provide an H of the ·SH group for each Cl atom in the said organo tin compound. In this instance it is desirable in some cases to warm the reacting material in contact with an acceptor for hydrogen chloride that splits off, as with soda ash or like conventional acid acceptor.

As the polyethylene we use the conventional branched (high pressure) polyethylene such as DYNH or Alathon, linear (low pressure) polyethylene such as Grex or Super-Dylan, or any other commercial grade of polyethylene.

The polypropylene used is the commercial material, an example being isotactic or Ziegler process polypropylene sold to Pro-Fax. This resin is substantially halide-free, the chlorine content being normally within the range from 0.005 to 0.008%.

The proportion of the viscosity preserver is about 0.01%–2% of the weight of the polyolefin and normally 0.05%–1%.

In one method of compounding, the polyolefin, normally in granular or powder form, is supplied to heated mixing rolls or other usual type of polyethylene compounding machine. The temperature is maintained at such point that the polyolefin softens sufficiently for good mixing with the melt index preserver. This preserver, in the roll mixing, is suitably applied over the surface of the plastic on the rolls, as from end-to-end of the cylinders of stock on the heated rolls. The mixing is continued, at a temperature of about 250°–325° F.

or so, the exact temperature to be used varying somewhat with the softening temperature of the particular polyolefin selected, until the mixture is substantially uniform. The resulting composition is then sheeted off, reduced to size and shape desired for marketing or use.

The invention will be further illustrated by description in connection with the following specific examples of the practice of it. In these examples and elsewhere herein proportions are expressed as parts by weight unless specifically stated to the contrary.

*Example 1*

100 parts DYNH (high pressure polyethylene) are warmed up to the softening temperature, milled on heated differential speed rollers (roll temperature ca. 280° F.), and there formed into a continuous band. To this is added 0.25 part of dibutyl tin dilauryl mercaptide (additive A) across the surface.

The additive is of the formula $(C_4H_9)_2Sn(SC_{12}H_{25})_2$.

Milling and mixing are continued until the viscosity preserver is homogeneously incorporated into the DYNH, which requires approximately 5 minutes. The resulting hot plastic is sheeted off. The cooled product is ready for use as a plastic.

For heat stability test, strips of approximately equal size and each about 1 x 1½ x 0.04 inch are cut off. These are heated in an oven to 400° F. and a sample is taken out every 15 minutes for observation. The results are compared in the table below with DYNH plastic with no additive incorporated by us.

| Additive, Percent of Polyethylene | Color of Sheeted Plastic After Heating at 400° F. for— | | |
|---|---|---|---|
| | 0 Min. | 45 Min. | 105 Min. |
| None (control) | None | Brown mottling. | Dark brown mottling. |
| A, 0.2% | None | Practically none. | Practically none.[1] |

[1] About equal to control specimen after 15 minutes.

*Example 2*

100 parts Grex powder (low pressure polyethylene) are mixed by hand with 0.5 part of tributyl tin isopropyl xanthate,

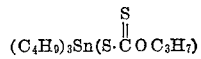

additive B, and the mix then placed on a two-roll mill heated to 310° F. Milling produces a continuous sheet which is worked by cutting and rolling until the viscosity preserver is homogeneously compounded with the resin. This takes about 10 minutes. Subsequently samples are cut off as described in Example 1 and heated in an oven for 2 hours at 400° F., with samples taken every 15 minutes for observations as to color development.

In the control sample, with no preserver added, discoloration starts after 15 minutes and intensifies substantially up to 2 hours.

In the sample containing the xanthate, there was no substantial discoloration in 2 hours at 400° F.

Data on viscosity preservation by the plastic containing the additive is that given earlier herein and tabulated more fully below.

| Preserver Added, Percent of Polyethylene | Increase of Melt Index, Percent, After Heating at 265° F. for Hours | | | | |
|---|---|---|---|---|---|
| | Original Melt Index | 4 | 8 | 48 | 120 |
| None (control) | 0.68 | | | | not tested. |
| B, 0.5 | 0.71 | +5 | +112 | Practically constant. | decreasing slightly. |

*Example 3*

The procedure of Example 1 or 2 is followed exactly except that the viscosity preserver there used is replaced by 0.2–0.75 part of any of the other viscosity preserving agents disclosed above.

Illustrative formulas for representative esters and amides included in these other preservers follow:

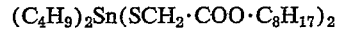

Dibutyl tin dioctylthioglycolate

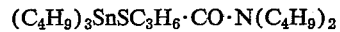

Tributyl tin thiobutyric-dibutylamide

*Example 4*

The procedure of Example 1 is followed except that the polyethylene there used was replaced by the isotactic polypropylene (Pro-Fax) and the milling temperature raised sufficiently to soften the polypropylene and dibutyl tin dilauryl mercaptide composition into a good workable compound, that is, to 300° F. or somewhat higher.

The compounded polypropylene and mercaptide was sheeted as usual and the sheets tested. The material preserved its sheet form without liquefaction at 400° F. for approximately 60 minutes.

Sheeted polypropylene, similarly made but without any mercaptide stabilizer, liquefied in this test after 15 minutes.

In another test in which the proportion of the said mercaptide was 0.5% of the weight of the polypropylene, the sheet did not liquefy during 2 hours of heating at 400° F.

The effectiveness of the dibutyl tin dilauryl mercaptide as a viscosity preserver was demonstrated also by evaluation in a Brabender Plastograph, as described in India Rubber World for October 1947, page 62. This instrument measures the relative consistency of plastic material at elevated temperature. This is done by means of a dynamometer attached to a heated mixing unit. The dynamometer records the resistance offered, by the material under test, to the mixing action of the blades. These values are continuously recorded in terms of gram-meters of torque. The higher the torque obtained, the greater is the consistency of the material, and consequently the greater is its molecular weight.

The results of the evaluation are shown in the table below, when the temperature of the mixing unit was 375° F. and the unit was operated at 63 r.p.m.

| After min. | Consistency of Polypropylene containing Various Amounts (Percent) of Dibutyl Tin Dilauryl Mercaptide at 375° F. in gram-meters of Torque | | |
|---|---|---|---|
| | 0% | 0.25% | 0.50% |
| 2 | 1,600 | 2,700 | 3,400 |
| 3 | 1,130 | 2,050 | 3,380 |
| 4 | 840 | 1,860 | 2,780 |
| 5 | 680 | 1,680 | 2,400 |
| 6 | 580 | 1,560 | |
| 8 | 440 | 1,400 | 2,160 |
| 10 | 360 | 1,260 | 2,080 |
| 14 | 260 | 810 | 1,960 |
| 18 | 205 | 500 | 1,770 |
| 22 | | | 1,570 |
| 26 | | | 1,450 |
| 30 | | | 1,330 |
| 35 | | | 920 |
| 40 | | | 560 |

In making the material for this Brabender test, the sample was generally charged to the mixer, within the first minute of operation. By the end of two minutes the sample was softened. The shape of the curve obtained indicated that the sample reached the test temperature of 375° F. after about 5 minutes of mixer operation. Comparison of the consistencies after 5 minutes indicates that the polypropylene alone fell in viscosity to a very appreciable extent during the time necessary to bring the batch to the desired temperature. The higher consistency readings for the compounds containing the dibutyl tin dilauryl mercaptide indicate that the latter material inhibits fall of viscosity during this initial heating period.

The polypropylene alone reached a consistency of 1,000 gram-meters 3.4 minutes after being charged to the mixer. When 0.25% of the mercaptide was added, a consistency of 1,000 gram-meters was obtained only after 12 minutes in the mixer. The use of this mercaptide in a proportion of 0.5% extended the time before a consistency of 1,000 gram-meters was obtained to 34.2 minutes.

*Example 5*

The procedure of Example 4 is followed except that the dibutyl tin dilauryl mercaptide there used as viscosity preserver is substituted by any of the other mercaptides referred to herein in equal proportions by weight.

Compositions made as described and containing the mercaptide show a very important decrease in rate of development of brittleness on exposure to light.

In making these tests of the effect of ultraviolet light, samples made as described in the examples were exposed in a weatherometer type XW at a black panel temperature of 125° F. With polypropylene (Pro-Fax) made by the Ziegler process; the specimen containing 0.5% of the mercaptide could be bent sharply and is flexible, that is, withstands many sharp bends before breaking. On the other hand, the same Pro-Fax mixed and sheeted similarly broke on one bending at less than an angle of 180°, these tests being made after 60 hours' exposure.

In a similar test with the Ziegler process, polyethylene (both Hy-Fax and Super-Dylan) conducted for 165 hours, both specimens made without mercaptide snapped when bent to an angle much less than 180°. With 0.5% of dibutyl tin dilauryl mercaptide incorporated as described during the making of the stocks, the flexibility and toughness were greatly increased.

It is to be understood that it is intended to cover all changes and modifications of the examples of the invention herein chosen for the purpose of illustration which do not constitute departures from the spirit and scope of the invention.

We claim:

1. Polypropylene substantially free from halide combined with a stabilizing amount of a tin mercapto compound which is nonvolatile and compatible with polypropylene, having the formula:

$$R_xSn(SR^1)_{4-x}$$

in which R is a monovalent hydrocarbon radical selected from the group consisting of alkyl radicals having from one to eighteen carbon atoms and aryl radicals having from six to fourteen carbon atoms, $x$ is an integer having a value from one to three and $R^1$ is a monovalent radical selected from the group consisting of alkyl radicals having from one to eighteen carbon atoms and aryl radicals having from six to fourteen carbon atoms and such alkyl and aryl radicals bearing an organic substituent selected from the group consisting of hydroxy, carboxy ester, carboxy, thioncarboxy and amido groups.

2. Polypropylene in accordance with claim 1 in which the polypropylene is isotactic polypropylene.

3. Polypropylene in accordance with claim 1 in which the stabilizing compound is dibutyl tin didodecyl mercaptide.

4. Polypropylene in accordance with claim 1 in which the stabilizing compound is tributyl tin isopropyl xanthate.

5. Polypropylene in accordance with claim 1 in which the stabilizing compound is dibutyl tin dioctylthioglycolate.

6. Polypropylene in accordance with claim 1 in which the stabilizer is in an amount with the range from 0.01 to 2%.

References Cited in the file of this patent

UNITED STATES PATENTS

| | | |
|---|---|---|
| 2,641,588 | Leistner et al. | June 9, 1953 |
| 2,704,756 | Leistner et al. | Mar. 22, 1955 |
| 2,731,440 | Stefl et al. | Jan. 17, 1956 |
| 2,731,441 | Stefl et al. | Jan. 17, 1956 |
| 2,759,906 | Leistner et al. | Aug. 21, 1956 |
| 2,789,102 | Weinberg | Apr. 16, 1957 |
| 2,789,104 | Ramsden et al. | Apr. 16, 1957 |
| 2,834,768 | Friedlander | May 13, 1958 |

OTHER REFERENCES

Raff: Polyethylene High Polymers, vol. XI, copyright 1956, Interscience Pub., Inc., New York, page 103.